US012164709B2

(12) United States Patent
Aoki et al.

(10) Patent No.: US 12,164,709 B2
(45) Date of Patent: Dec. 10, 2024

(54) INFORMATION PROCESSING SYSTEM, CONTROLLER, INFORMATION PROCESSING METHOD, AND COMPUTER-READABLE NON-TRANSITORY STORAGE MEDIUM HAVING STORED THEREIN INFORMATION PROCESSING PROGRAM

(71) Applicant: Nintendo Co., Ltd., Kyoto (JP)

(72) Inventors: Takafumi Aoki, Kyoto (JP); Takanori Okamura, Kyoto (JP); Yuki Taniguchi, Kyoto (JP); Hiroki Ikuta, Kyoto (JP); Masaya Takei, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 18/316,018

(22) Filed: May 11, 2023

(65) Prior Publication Data

US 2023/0280849 A1 Sep. 7, 2023

Related U.S. Application Data

(63) Continuation of application No. PCT/JP2020/046104, filed on Dec. 10, 2020.

(51) Int. Cl.
*G06F 3/038* (2013.01)
*G05G 9/047* (2006.01)
(Continued)

(52) U.S. Cl.
CPC ............ *G06F 3/038* (2013.01); *G05G 9/047* (2013.01); *G06F 3/016* (2013.01); *G06F 3/0338* (2013.01);
(Continued)

(58) Field of Classification Search
CPC .......... G05G 9/047; G05G 2009/04766; G06F 3/016; G06F 3/0338; G06F 3/038; G06F 2203/015
See application file for complete search history.

(56) References Cited

U.S. PATENT DOCUMENTS

| 7,113,166 B1 | 9/2006 | Rosenberg et al. |
| 2016/0361641 A1 | 12/2016 | Koizumi et al. |

(Continued)

FOREIGN PATENT DOCUMENTS

| JP | 7-213740 A | 8/1995 |
| JP | 2006-260001 A | 9/2006 |

(Continued)

OTHER PUBLICATIONS

International Search Report for PCT/JP2020/046104 mailed Mar. 9, 2021, 3 pages.

(Continued)

*Primary Examiner* — Nitin Patel
*Assistant Examiner* — Corey A Almeida
(74) *Attorney, Agent, or Firm* — Nixon & Vanderhye P.C.

(57) ABSTRACT

This information processing system includes: a controller including an operation element, a restriction member, a resistance section using a magnetorheological fluid whose viscosity changes with an applied-magnetic-field intensity and which serves as a resistance corresponding to the viscosity when the position of the operation element is displaced, and a magnetic field generation section to provide the magnetic field; and a circuit capable of controlling the magnetic field generation section. In a first state, a movable area of a position of the operation element is restricted to a basic movable area. In a second state, the magnetic field generation section is controlled so that the viscosity becomes a first viscosity, when the operation element is in (Continued)

a first area, and so that the viscosity becomes a second viscosity when the operation element is in a second area.

20 Claims, 13 Drawing Sheets

(51) Int. Cl.
  *G06F 3/01* (2006.01)
  *G06F 3/0338* (2013.01)
(52) U.S. Cl.
  CPC .............. *G05G 2009/04766* (2013.01); *G06F 2203/015* (2013.01)

(56) References Cited

U.S. PATENT DOCUMENTS

| | | |
|---|---|---|
| 2019/0286237 A1 | 9/2019 | Eck et al. |
| 2020/0125132 A1* | 4/2020 | Wakuda ................ G06F 3/0338 |

FOREIGN PATENT DOCUMENTS

| | | |
|---|---|---|
| JP | 2014-228703 A | 12/2014 |
| JP | 2015-525105 A | 9/2015 |
| JP | 2016-007345 A | 1/2016 |
| JP | 2017-004523 A | 1/2017 |
| JP | 2020-035376 A | 3/2020 |
| WO | 2014/004650 A1 | 1/2014 |
| WO | 2014/182254 A1 | 11/2014 |

OTHER PUBLICATIONS

Written Opinion of the ISA for PCT/JP2020/046104 mailed Mar. 9, 2021, 4 pages.
May 14, 2024 Search Report issued in European Patent Application No. 20965119.9, pp. 1-9.

* cited by examiner

F I G. 1
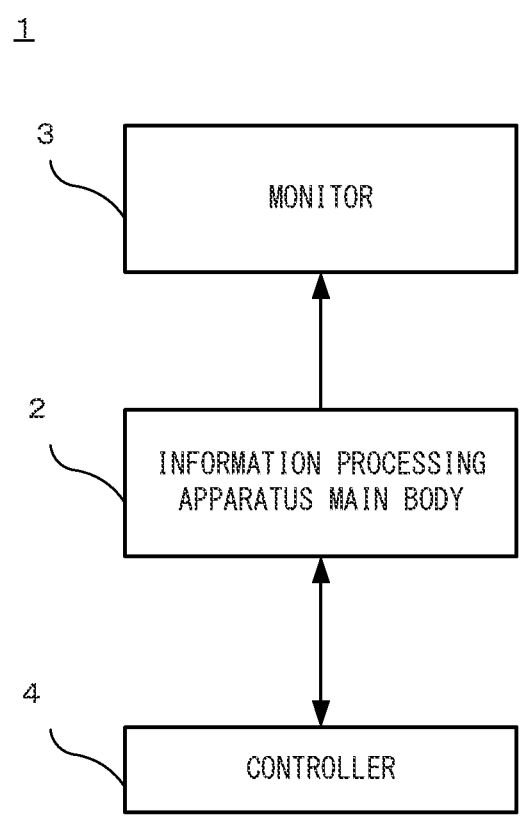

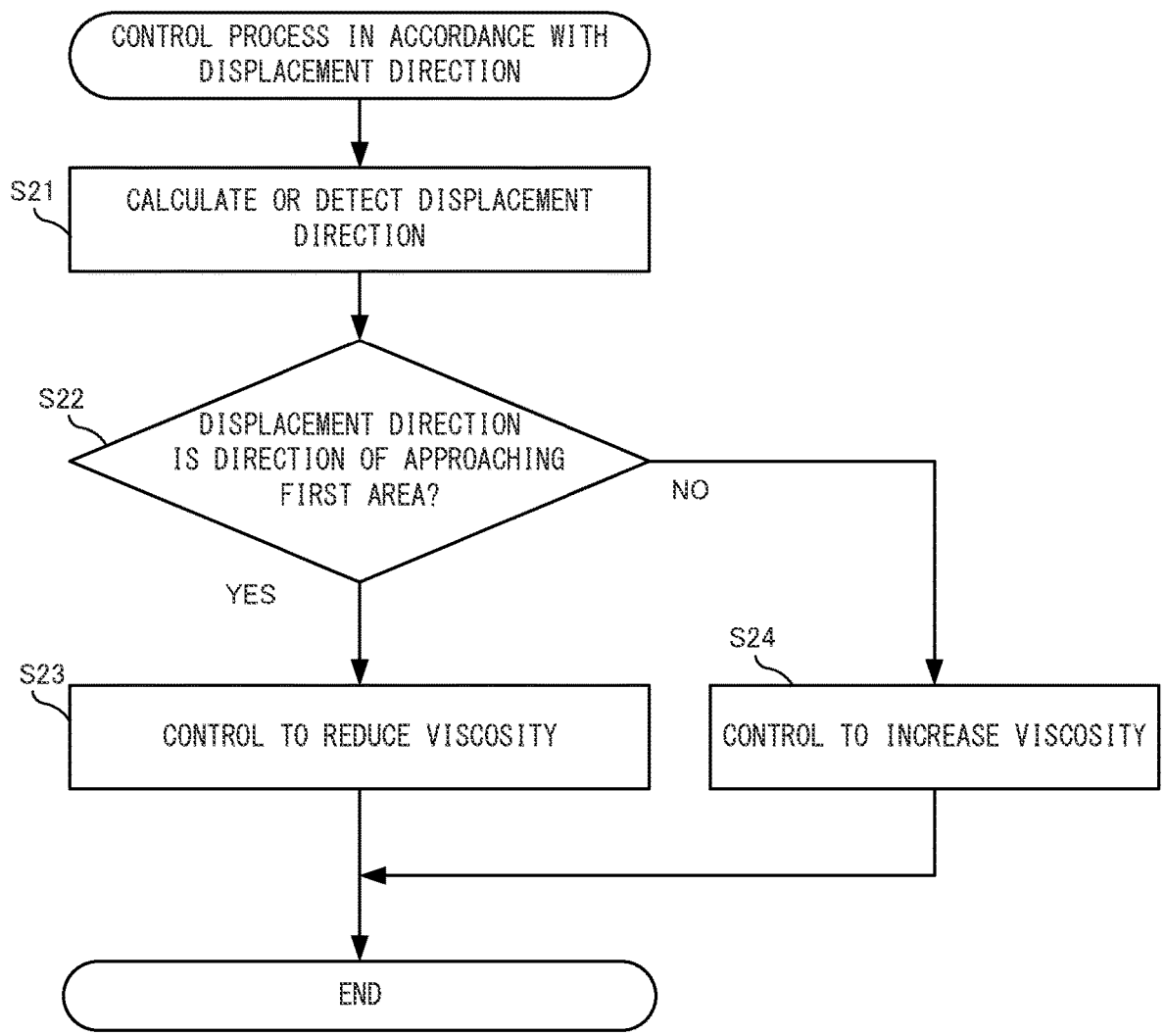

INFORMATION PROCESSING SYSTEM, CONTROLLER, INFORMATION PROCESSING METHOD, AND COMPUTER-READABLE NON-TRANSITORY STORAGE MEDIUM HAVING STORED THEREIN INFORMATION PROCESSING PROGRAM

CROSS REFERENCE TO RELATED APPLICATION

This application is a continuation of International Application No. PCT/JP2020/046104 filed on Dec. 10, 2020, the entire contents of which are incorporated herein by reference.

FIELD

The present disclosure relates to an information processing system including at least a controller having an operation element such as a button or a stick, a controller, an information processing method, and a computer-readable non-transitory storage medium having stored therein an information processing program.

BACKGROUND AND SUMMARY

Conventionally, there has been known a controller including an operation element such as a button or a stick.

In such a controller, there has been room for improvement in terms of enhancement of a feeling and an information amount that a user receives when operating an operation element.

Accordingly, an object of the present disclosure is to provide an information processing system, a controller, an information processing method, and a computer-readable non-transitory storage medium having stored therein an information processing program, that can enhance a feeling and an information amount that a user receives when operating an operation element.

The above object is achieved by the following configurations, for example.

One configuration example is an information processing system including: a controller including an operation element configured to be displaced from an initial position by a user's operation, a restriction member configured to restrict a movable area of a position of the operation element to a basic movable area which is a two-dimensional area, in a first state, a resistance section using a magnetorheological fluid whose viscosity changes in accordance with an intensity of a magnetic field applied thereto and which serves as a resistance corresponding to the viscosity when the position of the operation element is displaced, and a magnetic field generation section configured to provide the magnetic field to the magnetorheological fluid; and a circuit capable of controlling the magnetic field generation section. The circuit is capable of performing switching between the first state and a second state. The circuit is configured to, in the second state, control the magnetic field generation section so that the viscosity of the magnetorheological fluid becomes a first viscosity, when the operation element is located in a first area which is included in the basic movable area and includes the initial position, and control the magnetic field generation section so that the viscosity of the magnetorheological fluid becomes a second viscosity different from the first viscosity, when the operation element is located in a second area which is included in the basic movable area and is different from the first area.

According to the above configuration example, the viscosity of the magnetorheological fluid can be changed in accordance with the present position of the operation element. Thus, it becomes possible to make various expressions using a feeling on the operation element.

In another configuration example, the second viscosity may be set so that the viscosity of the magnetorheological fluid becomes higher than the first viscosity.

In another configuration example, the first viscosity may be such a viscosity that allows the position of the operation element to be displaced, and the second viscosity may be such a viscosity that the viscosity of the magnetorheological fluid serves as a resistance that substantially does not allow the position of the operation element to be displaced.

According to the above configuration example, the movable range of the operation element can be limited within the first area in a pseudo manner.

In another configuration example, the information processing system may further include an information processing apparatus capable of executing a predetermined application. Then, a position and/or a shape of the first area may be set in accordance with a situation in the predetermined application being executed in the information processing apparatus.

According to the above configuration example, the size and the shape of the displacement possible area to be set as the first area can be set flexibly in accordance with the situation in the application.

In still another configuration example, the predetermined application may be such an application that a predetermined object is operated as an operation target object by the user. Then, a position and/or a shape of the first area may be set in accordance with a state of the operation target object during execution of the predetermined application.

According to the above configuration example, the content of the first area is set in accordance with the state of the operation target object operated by the user. Thus, it is possible to make various expressions regarding the state of the operation target object, using a feeling given to the user by the operation element.

In still another configuration example, the predetermined application may be such an application that a predetermined object is operated as an operation target object in a virtual space by the user, and a position and/or a shape of the first area may be set in accordance with a presence position of the operation target object in the virtual space and/or a surrounding environment around the presence position.

According to the above configuration example, the content of the first area can be set in accordance with the surrounding environment around the place where the operation target object is present in the virtual space. Thus, regarding environments such as a terrain in the virtual space, it is possible to make various expressions using a feeling given to the user by the operation element.

In still another configuration example, the predetermined application may be such an application that any of a plurality of objects is allowed to be selected as an operation target object by the user or any of the objects is automatically selected, and a position and/or a shape of the first area may be set in accordance with the selected operation target object.

According to the above configuration example, it is possible to provide various operation feelings in accordance with a selected object in such an application that a predetermined object can be selected from a plurality of objects.

In still another configuration example, in the second state, the user may be notified of information indicating that the first area and the second area are being used.

In still another configuration example, in the second state, the information processing system may notify the user of information indicating a shape of the first area.

According to the above configuration example, while control is being performed using the first area and the second area, the user can recognize that the movable range of the operation element is in a state different from a normal state. Thus, the user can be prevented from being confused by sharp change in an operation feeling.

In still another configuration example, the information processing system may notify the user of information for instructing the user to move the operation element to the first area, when switching from the first state to the second state.

According to the above configuration example, in a case of limiting the movable range of the operation element into the first area in a pseudo manner, it is possible to notify the user of this in advance, and it is possible to notify the user that the position of the operation element needs to be moved, prior to the movable range limitation.

In still another configuration example, the information processing system may perform switching from the first state to the second state after, subsequent to the notification, the operation element is displaced into the first area.

According to the above configuration example, it is possible to start control in the second state after it is confirmed that the operation element has entered the inside of the first area.

In still another configuration example, the information processing system may further include displacement direction determination means configured to determine a displacement direction of the operation element. Then, when the operation element is located in the second area, the viscosity may be controlled in accordance with the displacement direction of the operation element.

According to the above configuration example, when the operation element is located in the second area, it is possible to perform viscosity control based on the displacement direction of the operation element.

In still another configuration example, in a case where the displacement direction is determined to be a first direction of moving from the second area toward the first area, the viscosity may be reduced.

According to the above configuration example, when the operation element is moved to return to the first area, it is possible to make it easy to return the operation element.

In still another configuration example, the first direction may be a direction of moving toward the initial position.

According to the above configuration example, when the operation element is moved to return to the initial position, it is possible to make it easy to return the operation element.

In still another configuration example, in a case where the displacement direction is, further from the second area, determined to be a second direction different from the first direction of moving from the second area toward the first area, the viscosity may be increased or the viscosity at that time may be kept.

According to the above configuration example, it is possible to suppress such movement that the operation element moves away from the first area.

In still another configuration example, the first area may be one of a first-type area having a shape with at least three corners as vertices, a second-type area having a shape extending in one predetermined axis direction passing the initial position, and a third-type area including an area extending in the one predetermined axis direction and an area extending in a second direction crossing at the initial position perpendicularly to the one predetermined axis direction.

In still another configuration example, the first area may be set as an area having the same size as the basic movable area, and the second area may be set such that an entire periphery thereof is surrounded by the first area and the second area is located so as to occupy a part of the first area.

According to the above configuration example, an area in which the operation element cannot be displaced can be set as the second area in a part of the basic movable area. Thus, with a feeling through the operation element, it is possible to provide the user such a feeling that some object is hidden at a certain position in the screen though nothing is displayed there on the screen, for example. In this way, an unprecedented new operation feeling can be provided to the user.

In still another configuration example, the information processing system may further include user setting means configured to set a position and/or a shape of the first area on the basis of the user's operation.

According to the above configuration example, it is possible to provide an operation feeling set in accordance with an individual difference and preference of each user.

In still another configuration example, the controller may include a first operation element and a second operation element. Then, the first area set for the first operation element and the first area set for the second operation element may be different in area size and/or area shape.

According to the above configuration example, it is possible to provide the user with different operation feelings on the two operation elements, respectively. Thus, various operation feelings can be provided to the user.

According to the exemplary embodiments, it becomes possible to make various expressions using a feeling on the operation element in accordance with a situation in an application.

BRIEF DESCRIPTION OF THE DRAWINGS

FIG. 1 shows a non-limiting example of the configuration of an information processing system 1;

FIG. 15 is a non-limiting example of a flowchart showing the details of a control process in a second example.

DETAILED DESCRIPTION OF NON-LIMITING EXAMPLE EMBODIMENTS

First, with reference to FIG. 1, an example of an information processing system according to the exemplary embodiment will be described. FIG. 1 schematically shows the configuration of the information processing system according to the exemplary embodiment. In FIG. 1, an information processing system 1 includes an information processing apparatus main body 2, a monitor 3, and a controller 4. In the information processing system 1, the information processing apparatus main body 2 executes predetermined information processing, and predetermined images and sounds generated as a result of the processing are outputted to the monitor 3. In the exemplary embodiment, the controller 4 includes a communication section capable of wireless communication, and is used while being wirelessly connected with the information processing apparatus main body 2. In another exemplary embodiment, the information processing apparatus main body 2 and the controller 4 may be connected with each other via a wire. Data indicating the content of a user's operation performed on the controller 4 is transmitted from the controller 4 to the information processing apparatus main body 2. Also, data for controlling operation of the controller 4 is transmitted from the information processing apparatus main body 2 to the controller 4. A controller control section (described later) included in the controller 4 performs various controls of the controller 4, including transmission and reception of such data.

Figure 2:
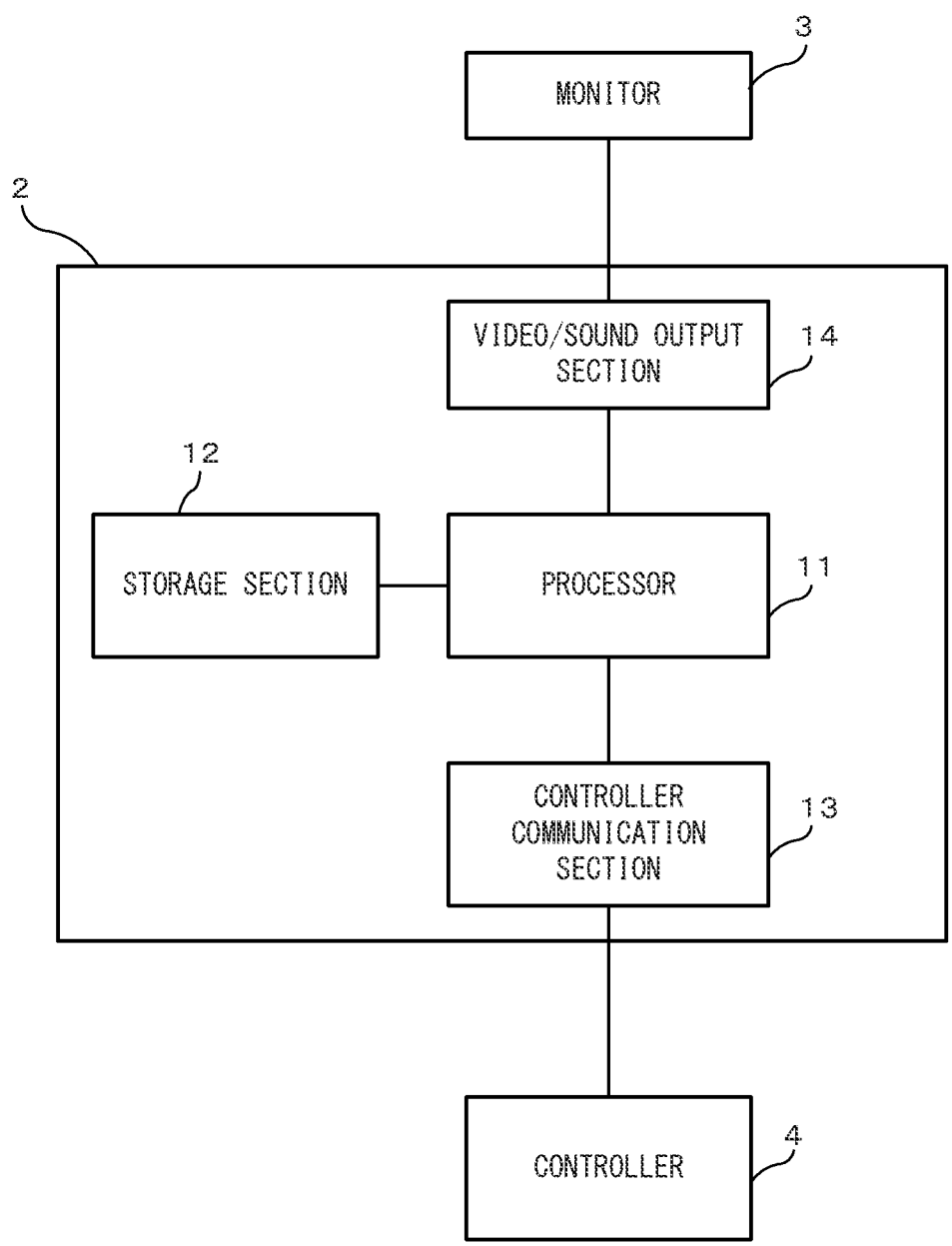
FIG. 2 is a function block diagram showing a non-limiting example of the internal configuration of an information processing apparatus main body 2.

Next, the internal configuration of the information processing apparatus main body 2 will be described. FIG. 2 is a function block diagram showing an example of the internal configuration of the information processing apparatus main body 2. In FIG. 2, the information processing apparatus main body 2 includes a processor 11. The processor 11 is a circuit for controlling the information processing apparatus main body 2. The processor 11 executes various information processes to be executed in the information processing apparatus main body 2. The processor 11 may be formed of only a central processing unit (CPU), or may be formed of a system-on-a-chip (SoC) including a plurality of functions such as a CPU function and a graphics processing unit (GPU) function, for example. The processor 11 executes an information processing program (e.g., predetermined application program) stored in a storage section 12, thereby executing various information processes. The storage section 12 may be an internal storage medium such as a flash memory or a dynamic random access memory (DRAM), or may be configured using an external storage medium mounted to a slot (not shown), or the like, for example.

A video/sound output section 14 is electrically connected with the processor 11, and outputs various images and sounds generated as a result of information processing executed by the processor 11, to the monitor 3. A controller communication section 13 is connected with the processor 11. The controller communication section 13 is for transmitting and receiving various data to and from the controller 4 connected wirelessly.

Figure 3:
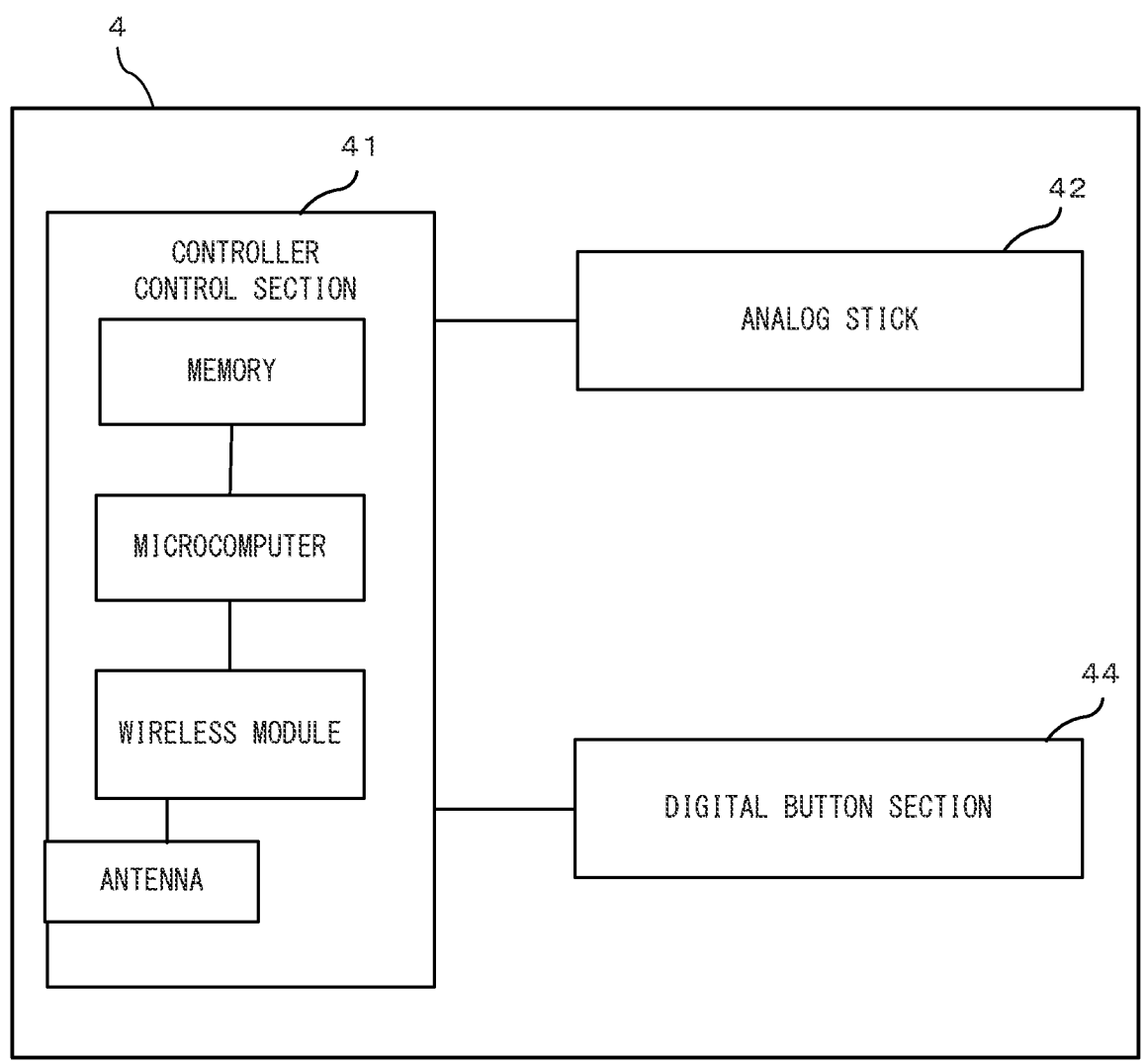
FIG. 3 is a function block diagram showing a non-limiting example of the internal configuration of a controller 4.

Next, the internal configuration of the controller 4 will be described. FIG. 3 is a function block diagram showing the internal configuration of the controller 4. In FIG. 3, the controller 4 includes a controller control section 41, an analog stick 42, and a digital button section 44. In the exemplary embodiment, a case where the controller 4 includes only one analog stick 42 is described. In another exemplary embodiment, the controller 4 may include a plurality of analog sticks 42. In addition, the controller 4 includes a battery and the like (not shown). Further, the controller 4 may include sensors such as an optical sensor and an inertial sensor.

The controller control section 41 is a circuit for controlling the controller 4, and includes, for control, a microcomputer, a memory, a wireless module, an antenna, and the like. While using the memory as a storage area in processing, the controller control section 41 controls the wireless module for wirelessly transmitting transmission data to the information processing apparatus main body 2. In the memory, data of a preset library and the like described later are also stored. In addition, the controller control section 41 performs processing such as control for the analog stick 42 as described later, in accordance with data received by the wireless module from the information processing apparatus main body 2 via the antenna.

The analog stick 42 is an operation element on which a direction can be inputted. A user can input a direction corresponding to a tilt direction by tilting the analog stick 42 (and input a magnitude corresponding to the tilt angle). The digital button section 44 includes at least one press-type button and/or trigger-type button.

Next, the configuration of the analog stick 42 in the exemplary embodiment will be described. In the exemplary embodiment, a configuration using a magnetorheological fluid (hereinafter, referred to as MRF) is adopted for the analog stick 42. Here, the MRF will be briefly described. The MRF has such characteristics that the MRF is a fluid when not subjected to a magnetic field, and comes into a semi-solid state (exhibits viscosity) when subjected to a magnetic field. In addition, the MRF also has characteristics of reacting to a magnetic field in several milliseconds. In the exemplary embodiment, the viscosity of the MRF is controlled and the MRF is caused to act on a movable axis of the analog stick 42 of the controller 4, whereby movability of the analog stick 42 is dynamically controlled.

Figure 4:
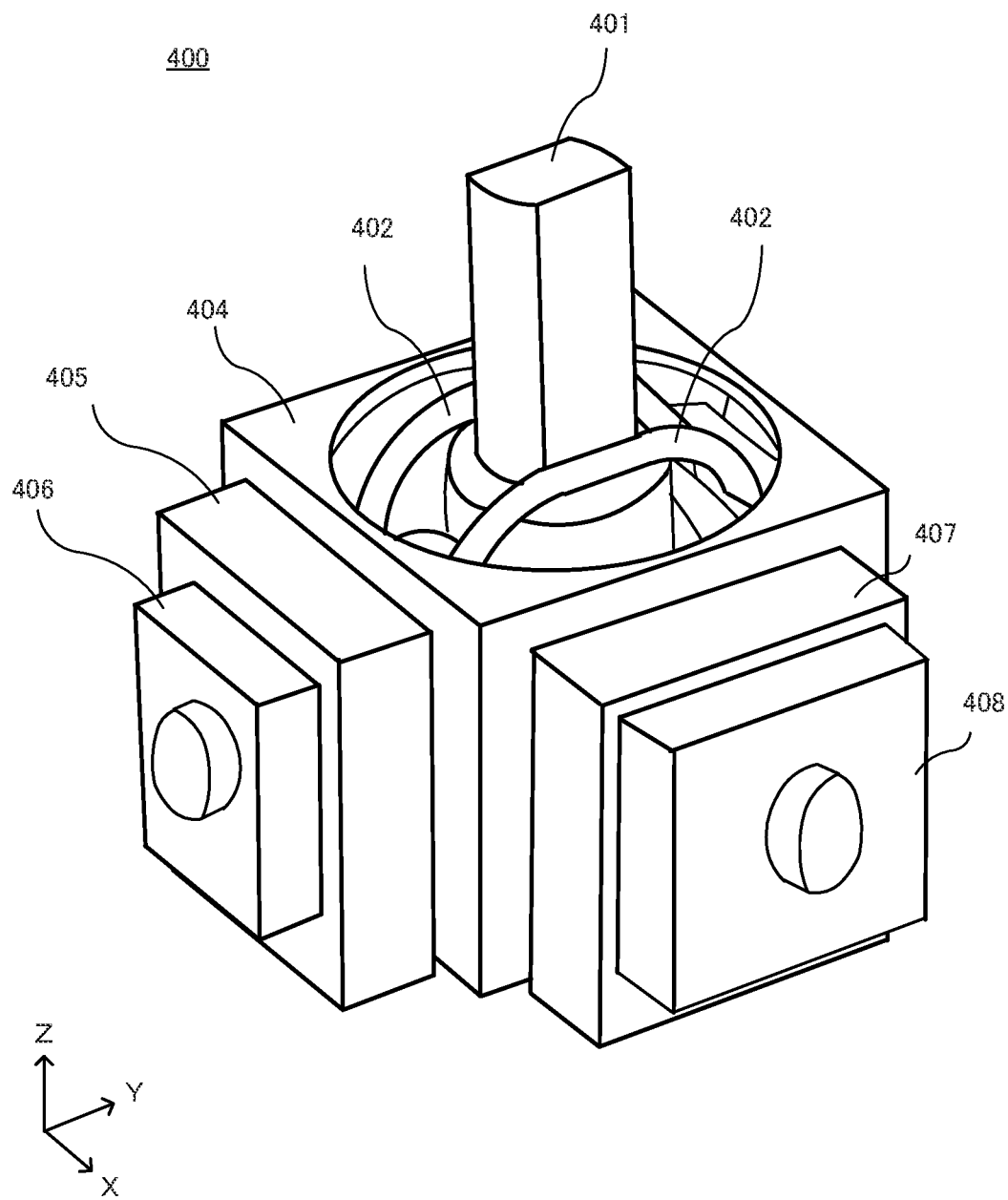
FIG. 4 is a perspective view showing a non-limiting example of a stick device.

FIG. 4 shows an example of the outer appearance of parts (hereinafter, stick device) composing the analog stick 42 assumed in the exemplary embodiment. FIG. 4 is a perspective view of a stick device 400 composing the analog stick 42. In FIG. 4, the stick device 400 includes a stick portion 401, an outer enclosure 404, an X-axis variable resistor 405, an X-axis MRF unit 406, a Y-axis variable resistor 407, and a Y-axis MRF unit 408. Also, X-axis drive components 402 are provided adjacently to the stick portion 401. Although not shown, the stick device 400 further includes Y-axis drive components 403 described later. In a completed product of the controller 4, for example, a mushroom-shaped cover is put over the stick portion 401 of the stick device 400.

The stick portion 401 is a stick-shaped movable part. The X-axis variable resistor 405 and the Y-axis variable resistor 407 are for detecting the tilt degree of the stick portion 401. The X-axis MRF unit 406 and the Y-axis MRF unit 408 are for causing the MRF to act on the movable axis of the analog stick 42, as described above.

Figure 5:
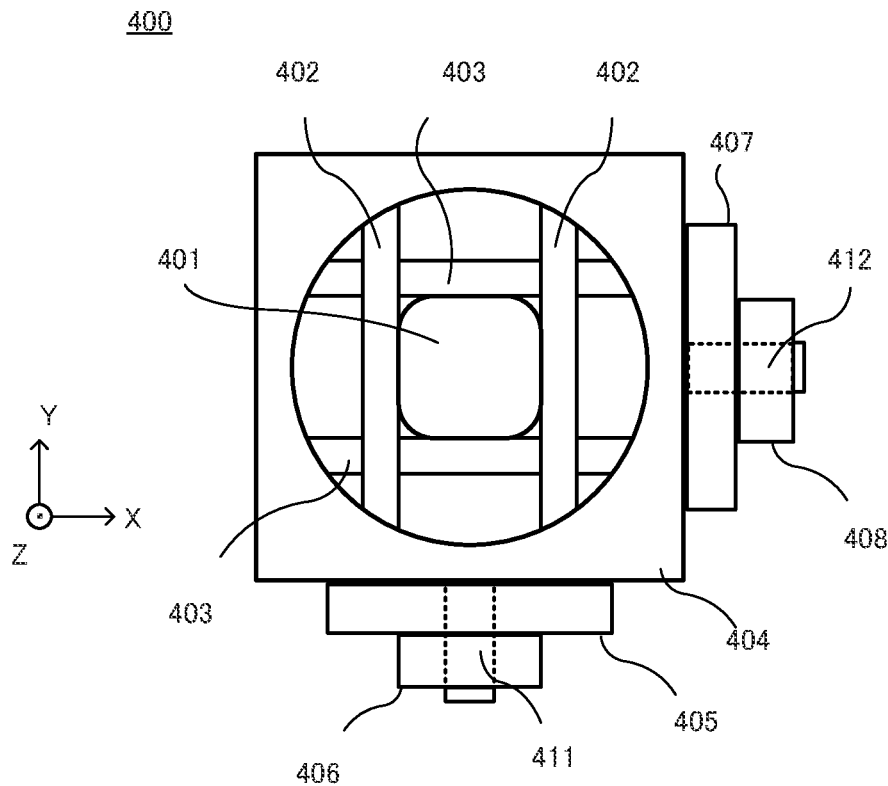
FIG. 5 is a schematic view showing a non-limiting example of the positional relationship among parts of the stick device.
Figure 6:
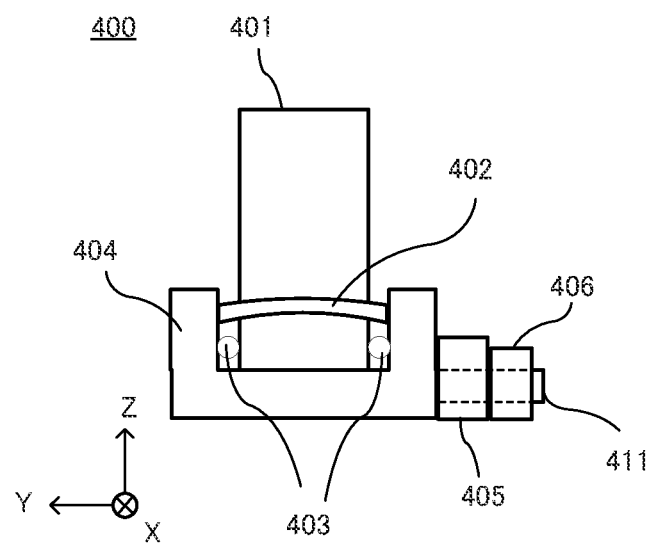
FIG. 6 is a schematic view showing a non-limiting example of the positional relationship among parts of the stick device.
Figure 7:
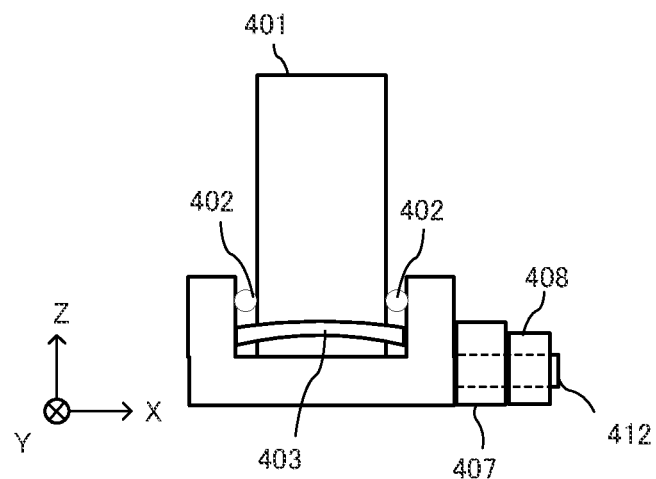
FIG. 7 is a schematic view showing a non-limiting example of the positional relationship among parts of the stick device.

FIG. 5 is a schematic view showing the positional relationship among parts when the stick device 400 is viewed from above. FIG. 6 and FIG. 7 are schematic views (sectional views) showing the positional relationship among parts when the stick device 400 is viewed from lateral sides.

FIG. 6 is a view as seen from the left side in FIG. 5, and FIG. 7 is a view as seen from the lower side in FIG. 5. As shown in FIG. 5 to FIG. 7, the stick portion 401 is placed such that the center of the stick portion 401 is located at the center position of the outer enclosure 404. In addition, the stick portion 401 is placed such that the longitudinal direction thereof is parallel to the Z axis. In the following description, the position of the center is referred to as an initial position, and an orientation in which the longitudinal direction of the stick portion 401 is parallel to the Z axis is referred to as an initial state.

In FIG. 5, the X-axis drive components 402 and the Y-axis drive components 403 are provided adjacently to the stick portion 401. The X-axis drive components 402 move the X-axis variable resistor 405 in coordination with movement in the X axis of the stick portion 401. The Y-axis drive components 403 move the Y-axis variable resistor 407 in coordination with movement in the Y axis of the stick portion 401. Therefore, although not directly shown in the drawings, the X-axis drive components 402 are connected to the X-axis variable resistor 405 so as to coordinate therewith (inside the outer enclosure 404). Similarly, the Y-axis drive components are connected to the Y-axis variable resistor 407 so as to coordinate therewith.

Regarding the movable range of the stick, in the exemplary embodiment, in a case of tilting the stick portion 401, the stick portion 401 can be tilted up to the edge of a circular opening provided to the outer enclosure 404. That is, the circular opening restricts a basic movable area of the stick portion 401 (analog stick 42). In another exemplary embodiment, as a member for the restriction, for example, a restriction member having a similar function may be provided at a base part of the stick portion 401. Alternatively, in a completed product of the controller 4, a housing of the controller 4 may be used as a restriction member. That is, the housing may be provided with an opening having a predetermined shape, at a part where the stick device 400 is attached, so that the edge of the opening (shape) serves as a limitation boundary of the movable area of the analog stick 42 on the X axis and the Y axis. In the exemplary embodiment, the opening has a circular shape, and therefore the two-dimensional area of the circular shape is the movable range of the analog stick 42 on the XY plane. Hereinafter, the movable range limited by a physical restriction member as described above is referred to as a basic movable area.

Although not shown, a restoring force imparting section which is a mechanism for restoring the stick portion 401 to the initial position is provided below the stick portion 401. The restoring force imparting section is formed by a member or the like that has therein an elastic body such as a coil spring and transmits a restoring force for returning to the initial position so as to bring back the stick portion 401 into a vertical condition. In the exemplary embodiment, the greater the tilt of the stick portion 401 is, the greater the restoring force for returning to the initial position is. In addition, the restoring force imparting section works to restore the above drive components coordinating with the stick portion 401 to reference positions. A mechanism for imparting the restoring force is a known one and therefore the detailed description thereof is omitted. For example, the restoring force imparting section having the elastic body may be placed vertically to the bottom surface of the outer enclosure 404. Then, the drive body may be kept in a reference state by forces being applied directly or indirectly to the drive components.

Regarding the restoring force imparting section, the elastic body is used in the exemplary embodiment. In another exemplary embodiment, for example, a configuration using a magnet may be adopted as long as the same function is exerted. A configuration using a restoration mechanism that can actively control the restoring force may be adopted. In this case, a gear, a motor, and the like may be used in addition to or instead of the elastic body, the magnet, and the like.

The stick device 400 has the X-axis variable resistor 405 and the Y-axis variable resistor 407 adjacently to the outer enclosure 404. The variable resistor is a known technology and therefore the detailed description thereof is omitted. The X-axis variable resistor 405 and the Y-axis variable resistor 407 are for detecting the tilt degree or the displacement direction of the stick portion 401. Each variable resistor is provided with a rotary shaft connected to the above drive components. The drive components rotate the rotary shaft in coordination with tilt and restoration movements of the stick portion 401. Then, a resistance value corresponding to the rotation of the rotary shaft is detected. Using a digital value calculated on the basis of the resistance value, the processor 11 or the controller control section 41 can determine the direction in which the stick portion 401 moves (hereinafter, displacement direction) and the tilt degree, etc. of the stick portion 401 (hereinafter, such information is simply referred to as "position of the analog stick").

In the exemplary embodiment, the displacement direction of the stick portion 401 is calculated with software means by the processor 11 or the controller control section 41. However, a main component that performs this calculation is not limited to the above ones. For example, in another exemplary embodiment, a configuration in which the displacement direction is mechanically detected using a predetermined sensor may be adopted.

The stick device 400 has the X-axis MRF unit 406 adjacently on the outer side of the X-axis variable resistor 405. Similarly, the stick device 400 has the Y-axis MRF unit 408 adjacently on the outer side of the Y-axis variable resistor 407. In the exemplary embodiment, the rotary shaft 411 used in the X-axis variable resistor 405 extends outward, and the X-axis MRF unit 406 is provided so as to surround the rotary shaft 411. Similarly, the rotary shaft 412 used in the Y-axis variable resistor 407 extends outward, and the Y-axis MRF unit 408 is provided so as to surround the rotary shaft 412. Regarding the rotary shaft, for example, a configuration in which the rotary shaft used in the X-axis variable resistor 405 is connected with a rotary shaft in the MRF unit so as to coordinate therewith, may be adopted. In the following description, the X-axis MRF unit 406 and the Y-axis MRF unit 408 may be collectively referred to as MRF units.

Figure 8:
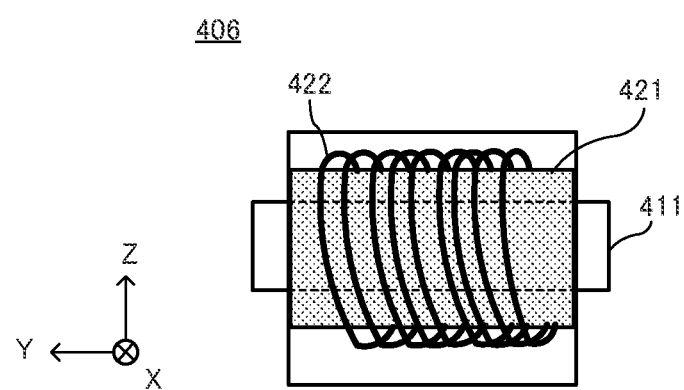
FIG. 8 is a schematic view illustrating a non-limiting example of the configuration of an MRF unit.

Next, the configuration of the MRF unit will be described. FIG. 8 is a simplified schematic view illustrating a configuration example of the MRF unit. In FIG. 8, the rotary shaft 411 (a part thereof) connected (or joined) to the variable resistor penetrates an MRF container 421 containing an MRF. A magnetic field generation section 422 is provided so as to surround the outer side of the MRF container 421. The magnetic field generation section 422 is a coil, for example. The MRF unit is configured to be capable of causing current to flow through the magnetic field generation section 422. It is possible to generate a magnetic field by causing a predetermined amount of current to flow through the magnetic field generation section 422. Thus, the viscosity of the MRF in the MRF container 421 can be changed. That is, by controlling the amount (i.e., amplitude) of current to be applied to the magnetic field generation section 422, it is possible to control the intensity of the magnetic field and thus control the magnitude of the viscosity of the MRF. By increasing the viscosity of the MRF, it is possible to impart resistance against the rotational force of the rotary shaft 411. Since the rotary shaft 411 is connected so as to coordinate with the tilt of the stick portion 401 as described above, it is possible to impart a resistance force against a force to tilt the stick portion 401, through change in the viscosity of the MRF. That is, in the exemplary embodiment, the configuration is made such that movability of the stick portion 401 can be controlled by controlling the viscosity of the MRF as described above.

The view in FIG. 8 is shown in a simplified manner, for convenience of description. A supplementary description will be given about a more specific configuration of the MRF unit. A basic mechanism thereof is a structure similar to a disc brake of a bicycle or an automobile. Such a disc brake has a mechanism in which a rotating wheel is directly squeezed by mechanical parts to stop rotation by friction between parts. In a case of using the MRF as in the exemplary embodiment, a frictional force is changed through control of the viscosity of the fluid, whereby movement in the rotational direction is restricted.

Figure 9:
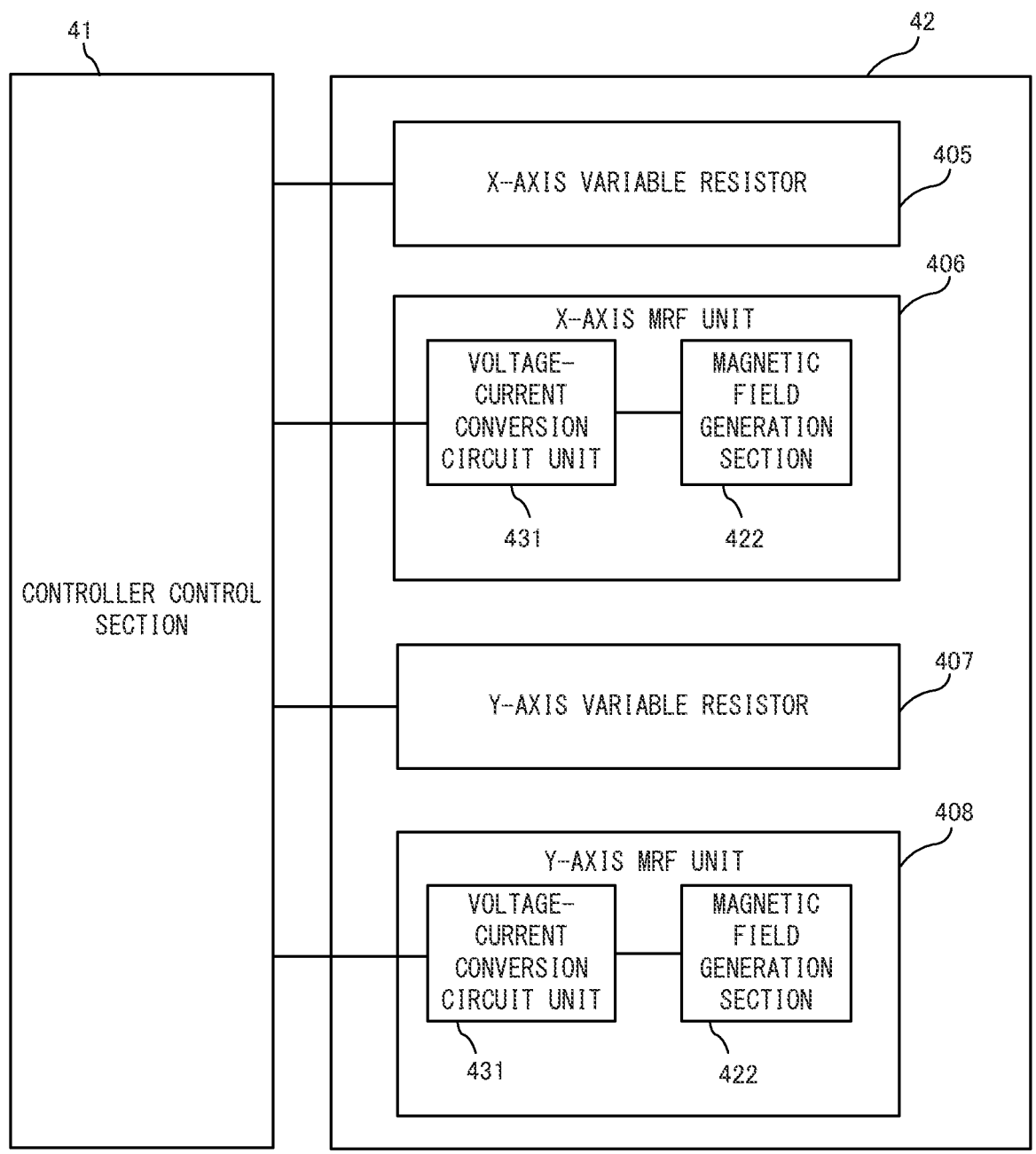
FIG. 9 is a function block diagram showing a non-limiting example of the internal configuration of an analog stick 42.

Next, the internal (electrical) configuration of the analog stick 42 will be described. FIG. 9 is a function block diagram showing the internal configuration of the analog stick 42. In FIG. 9, the analog stick 42 includes the X-axis variable resistor 405, the X-axis MRF unit 406, the Y-axis variable resistor 407, and the Y-axis MRF unit 408. These components are electrically connected with the controller control section 41, and predetermined data can be transmitted and received therebetween. The controller control section 41 can receive signals (e.g., voltage values) of the X-axis variable resistor 405 and the Y-axis variable resistor 407. On the basis of these signals, the controller control section 41 can calculate the position of the stick portion 401, the displacement direction thereof, and the change speed (displacement speed) of the position. The controller control section 41 can transmit a calculation result to the information processing apparatus main body 2. The position of the analog stick 42 is represented as two-dimensional coordinates on a two-dimensional plane with the center position as the initial position (origin), for example. On the basis of data transmitted from the information processing apparatus main body 2, the controller control section 41 can transmit, to each MRF unit, a signal for controlling the viscosity of the MRF unit, as described below.

Next, the MRF units will be described. The X-axis MRF unit 406 includes a voltage-current conversion circuit unit 431, and the magnetic field generation section 422 as described above, and both units are electrically connected to each other. When predetermined voltage is given to the voltage-current conversion circuit unit 431 from the controller control section 41, current based on the voltage can be outputted to the magnetic field generation section 422. As a result, the viscosity of the MRF can be changed as described above. Similarly, the Y-axis MRF unit 408 includes a voltage-current conversion circuit unit 431 and the magnetic field generation section 422, and the same control as described above can be performed. Thus, in the exemplary embodiment, it is possible to cause an influence due to viscosity change of the MRF, individually on each of the X axis and the Y axis in the stick portion 401. Basically, movability (viscosity) of the analog stick 42 is represented by the sum of values on two axes, i.e., the X axis and the Y axis. Meanwhile, for example, by increasing only the viscosity of the MRF of the Y-axis MRF unit 408, it is possible to make a state in which the stick portion 401 can be moved only in the X axis direction.

By performing viscosity control for the MRF with the above configuration, in the exemplary embodiment, it is possible to present various feelings to the user (user's fingers) operating the analog stick 42. For example, by controlling the viscosity of the MRF in accordance with a predetermined scene in an application, it is possible to give various feelings corresponding to the scene, to the fingers of the user operating the analog stick 42. In a case where the controller 4 includes a plurality of analog sticks 42, it is possible to control the viscosity of each analog stick individually. Thus, it is possible to provide an unprecedented new operation feeling to the user.

First Example

Figure 10:
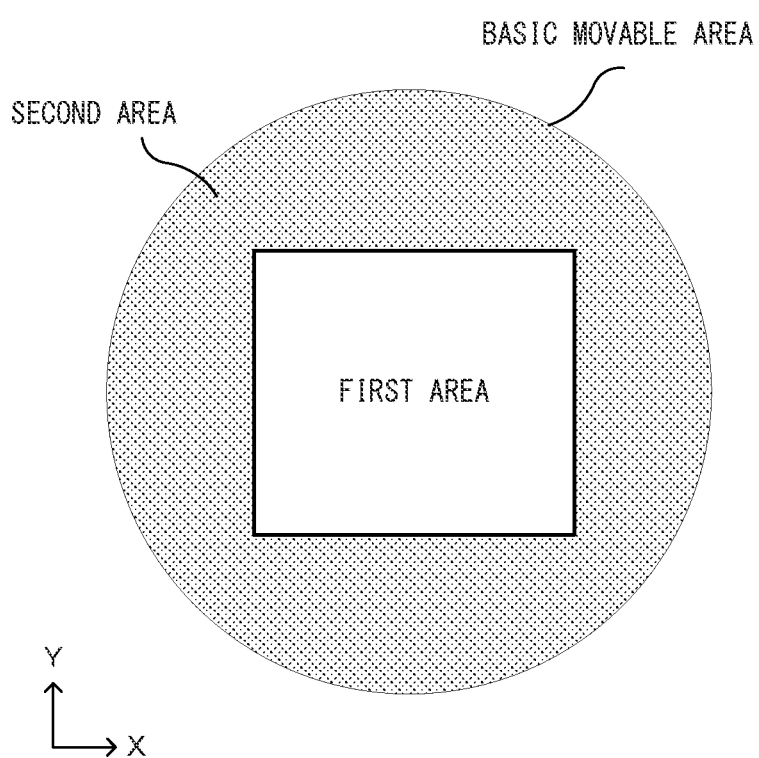
FIG. 10 shows a non-limiting example of an area pattern.

Next, a first example using the above configuration will be described. In the first example, the viscosity of the MRF is controlled in accordance with the present position of the analog stick. Specifically, in the first example, two kinds of viscosities are used: a viscosity (hereinafter, first viscosity) at such a level that the analog stick 42 can be freely moved without a resistance feeling and a high viscosity (hereinafter, second viscosity) at such a level that the analog stick 42 cannot be moved with a normal force degree. Then, on the basic movable area, an area to have the first viscosity and an area to have the second viscosity are defined in advance. FIG. 10 shows an example of definition of these areas. In FIG. 10, a rectangular area including a center part of the basic movable area is defined as a first area. In addition, the other area (area indicated by a hatched pattern) surrounding the entire periphery of the first area is defined as a second area. In this example, the first viscosity is assigned to the first area, and the second viscosity is assigned to the second area. Then, the viscosity of the MRF is controlled to be the first viscosity or the second viscosity in accordance with in which area the position of the analog stick 42 is. That is, if the present position of the analog stick 42 is in the first area, the viscosity of the MRF is controlled to be the first viscosity, and if the present position of the analog stick 42 is in the second area, the viscosity of the MRF is controlled to be the second viscosity. In other words, in a case where the position of the analog stick 42 is in the first area, the first viscosity is set over the entire movable area of the analog stick 42, i.e., the entirety of the basic movable area. On the other hand, in a case where the position of the analog stick 42 is outside the first area, i.e., in the second area, the second viscosity is set over the entirety of the basic movable area, including the first area in FIG. 10. Through such control, the user can eventually feel that the movable areas as shown in FIG. 10 seem to be present.

Here, a supplementary description will be given about the second viscosity. As described above, in this example, the second viscosity is a high viscosity at such a level that the analog stick 42 cannot be moved with a normal force degree. Nevertheless, the second viscosity is also assumed to be such a viscosity that the analog stick 42 can be moved if a considerably greater force than a normal force degree is applied with the fingers (though the operation feeling is considerably "heavy"). In other words, the second viscosity is such a viscosity that the MRF serves as a resistance that substantially does not allow the operation element to be displaced. In another example, the second viscosity may be such a viscosity that the MRF serves as a resistance that allows movement at any rate with a force not as great as a "considerably great force" though a greater force than for the first viscosity is needed. For example, when the force degree is represented by numerical values 1 to 10, the normal force degree (force degree for first viscosity) is defined as "1". In the first example, it is assumed that the second viscosity is such a viscosity that the operation element cannot be displaced unless a force close to "10" is applied. In another example, the second viscosity may be such a viscosity that the operation element can be displaced at any rate with a force degree of about "5".

In this example, the first viscosity is set at such a viscosity that the analog stick 42 can be freely moved without a resistance feeling. In another example, refraining from performing viscosity control may be considered to correspond to control for the first viscosity.

Here, both of the first area and the second area may have any shapes and may be arranged at any positions. A plurality of combinations of patterns of the first area and the second area (hereinafter, referred to as area patterns) may be prepared, and may be selectively used in accordance with the situation. In the exemplary embodiment, as an example, a case where area patterns to be used are selected in accordance with the situation and the scene in the application being executed will be described.

Application Examples of Control Assumed in the Exemplary Embodiment

Here, several examples of the situation in the application and selective use of area patterns are shown. First, an application in which a virtual object is operated on the basis of a user's input for operating a predetermined object, is assumed. In such an application, for example, area patterns to be used may be changed between a scene in which the user operates a menu screen or the like and a scene in which the user operates a predetermined operation object. In this case, in the scene where the user operates a menu screen or the like, control based on an area pattern in which the first viscosity is set over the entire basic movable area may be performed (that is, the second area is not present in this area pattern). On the other hand, in the scene in which the user operates a predetermined operation object, viscosity control based on a predetermined area pattern using also the second area may be performed so that an operation feeling corresponding to the characteristics of the operation object can be provided. In addition, separately from the above, in the scene in which the user operates a menu screen or the like, a menu screen area pattern corresponding to the layout of the menu screen may be used, and on the other hand, in the scene in which the user operates a predetermined operation object, an operation object area pattern may be used separately from the above one. In this way, by selectively using area patterns in accordance with the situation and the scene in the application, it is possible to provide the user with various operation feelings.

As another example of switching in accordance with the situation and the scene, the following control may be performed. First, an application in which an operation target object is moved in a virtual three-dimensional space by using the analog stick 42, is assumed. In addition, it is assumed that a parameter called a vitality value is set for the operation target object and the operation target object becomes unable to move when the vitality value has become 0. In such an application, normally, the operation target object can be operated over the entire basic movable area, but when the vitality value has become a certain value or less, for example, viscosity control based on an area pattern as shown in FIG. 10 is performed. Thus, the user can feel that the operation is limited within the first area, and when the operation target object falls into a disadvantageous state, for example, "difficulty in movement due to vitality reduction" can be expressed by an operation feeling on the analog stick 42.

As still another example of such switch control, the following control is also possible. First, as in the above case, an application in which an operation target object is moved in a virtual three-dimensional space is assumed. Then, control may be performed such that the content of the first area and the second area are set in accordance with the terrain and the nature of a place in the virtual space where the operation target object is located, or the surrounding environment therearound. For example, in a case where the place where the operation target object is located is a place where movement is relatively easy (e.g., a place where the movement speed of the operation object according to an input on the analog stick is set to be relatively fast), an operation can be performed with the entire basic movable area used. On the other hand, in a case where the place where the operation target object is located is a place where movement is relatively difficult (e.g., a place where the movement speed of the operation object according to an input on the analog stick is set to be relatively slow), viscosity control using a predetermined area pattern is performed, for example. As the area pattern in this case, a range having a circular shape whose size is about half the size of the basic movable area is defined as the first area having the first viscosity, for example. Other than the above, for example, in a scene in which there is an obstacle such as a wall around an operation object, control may be performed so as to use an area pattern corresponding to the obstacle (the positional relationship between the obstacle and the operation object). For example, when walls are present on the front side and the right side of the operation object, viscosity control may be performed using an area pattern having a shape defined so as to prevent the analog stick 42 from tilting upward and rightward.

As still another control example, control may be performed such that, normally, viscosity control is performed using an area pattern that limits the movable range, and in accordance with the situation in the application, the area pattern is changed to an area pattern in which the entire basic movable area can be used (that is, the movable area expands).

As still another example of the switch control, in an application in which an operation target object can be selected from a plurality of objects, control may be performed so as to set an area pattern (that differs) in accordance with the selected operation target object. Regarding the selection method, selection may be arbitrarily performed by the user, or may be performed automatically. In such an application, area patterns associated with respective operation target objects may be defined in advance. Then, without performing viscosity control on a selection screen for operation target objects, after an operation target object is selected, viscosity control may be performed on the basis of the area pattern associated with the selected operation target object.

Figure 11:
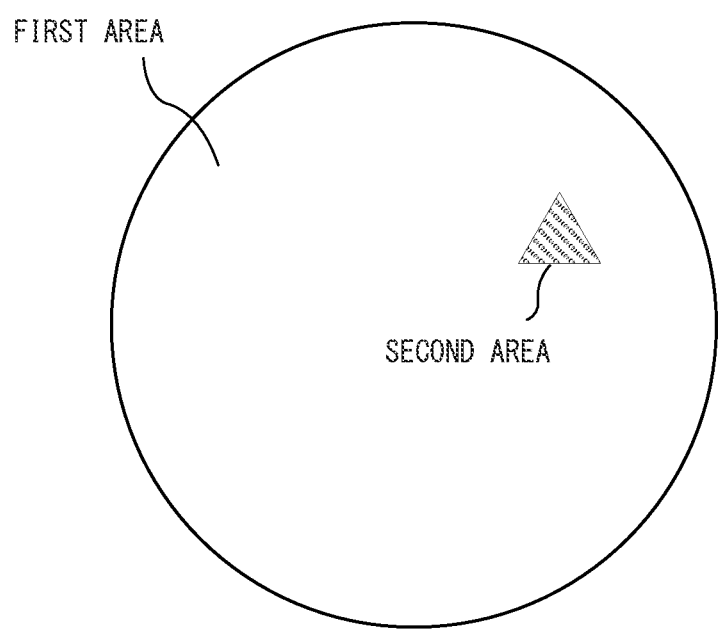
FIG. 11 shows a non-limiting example of an area pattern.

As an example of an area pattern which is a little different from those shown in the description of the above selective use, an area pattern as shown in FIG. 11 may be used. In FIG. 11, an area having substantially a triangular shape is defined as the second area and the other area is defined as the first area. In addition, the first area corresponds to the first viscosity, and the second area corresponds to the second viscosity. As a scene in the application when this area pattern is used, a scene in which an operation target object is moved using the first area having the same size as the basic movable area, is assumed. In particular, it is assumed that the correlation between the position of the analog stick 42 and the position of the operation target object is fixed. In such a case, it is possible to provide the user with such a feeling that the user has difficulty in moving the analog stick 42 only at a part corresponding to the second area, while basically letting the user feel that the analog stick 42 can be freely moved over the entire basic movable area. As it were, it is possible to provide the user with a feeling like "being caught" at the second area. Further, in this case, the appearance of the second area on the screen may be displayed so as to be the same as the other area. Moreover, the position of the second area may be controlled so as to sequentially change in accordance with the position (coordinates) of the operation target object in the virtual space. Thus, it becomes possible to provide such an application that the user finds out the position of the second area which is invisible on the screen with the help of the feeling obtained from the analog stick 42.

[Details of Processing in First Example]

Figure 12:
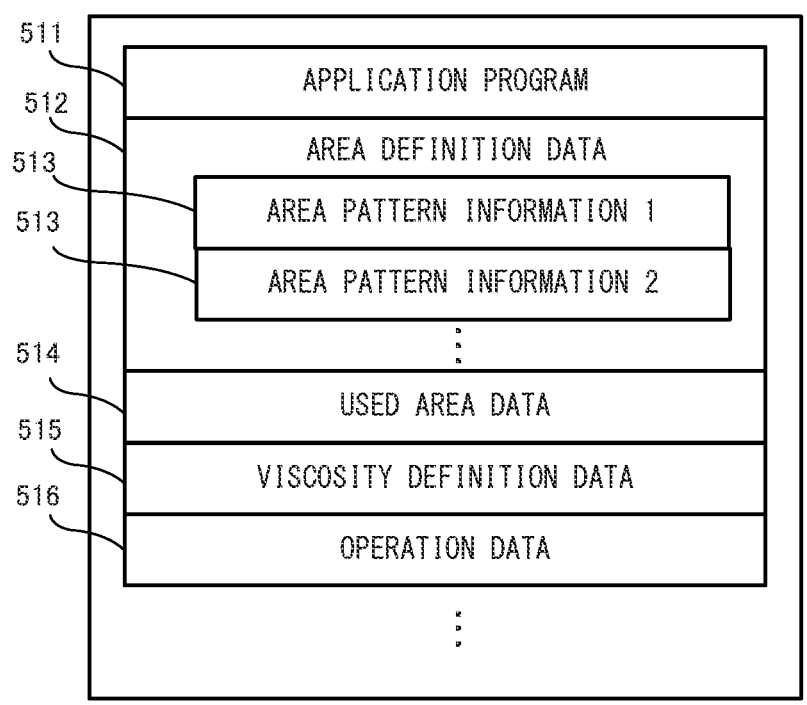
FIG. 12 shows a non-limiting example of data stored in the storage section 12 of the information processing apparatus main body 2.

Hereinafter, the details of processing in the first example will be described. First, an example of data to be used in the processing will be described. FIG. 12 shows an example of data stored in the storage section 12 of the information processing apparatus 2. The storage section 12 stores an application program 511, area definition data 512, used area data 514, viscosity definition data 515, operation data 516, and the like.

The application program 511 is a program for implementing a predetermined application.

The area definition data 512 is data defining the first area and the second area as described above. Here, a configuration using only one area pattern may be adopted, but in this example, a plurality of area patterns are used. Therefore, in the area definition data 512, pieces of information defining the contents of the respective area patterns are stored as pieces of area pattern information 513.

The data structure of each area pattern information 513 may be any data structure as long as the range of each area and what viscosity is set can be specified. For example, the following data structure is conceivable. That is, the entire basic movable area may be represented by two-dimensional arrangement of 100×100 locations, and information designating which of control for the first viscosity and control for the second viscosity is to be performed at the coordinates of each location is defined for the respective locations.

Next, the used area data 514 is data for designating the area pattern to be used at present, among the plurality of area patterns.

The viscosity definition data 515 is a parameter for realizing the first viscosity and the second viscosity described above. Specifically, for the first viscosity and the second viscosity, the parameter designates three values, i.e., the amplitude, the frequency, and the application time to be outputted from the controller control section 41 to the voltage-current conversion circuit unit 431 (hereinafter, the three values are referred to as a viscosity parameter). In the controller 4, a voltage command value whose waveform has components of the viscosity parameter is outputted to the voltage-current conversion circuit unit 431, and current based on the voltage command value is outputted to the magnetic field generation section 422. The magnetic field thus generated can change the viscosity of the MRF. In this example, in accordance with the present position of the analog stick 42, a viscosity parameter corresponding to the first viscosity or a viscosity parameter corresponding to the second viscosity is determined, and the viscosity parameter is outputted from the application (via system software) to the controller control section 41.

In the operation data 516, data outputted from the controller control section 41 at a predetermined cycle is stored. The operation data 516 includes data indicating the position of the analog stick 42 and data indicating the press states of various buttons.

[Flow Example of Processing in Exemplary Embodiment]

Figure 13:
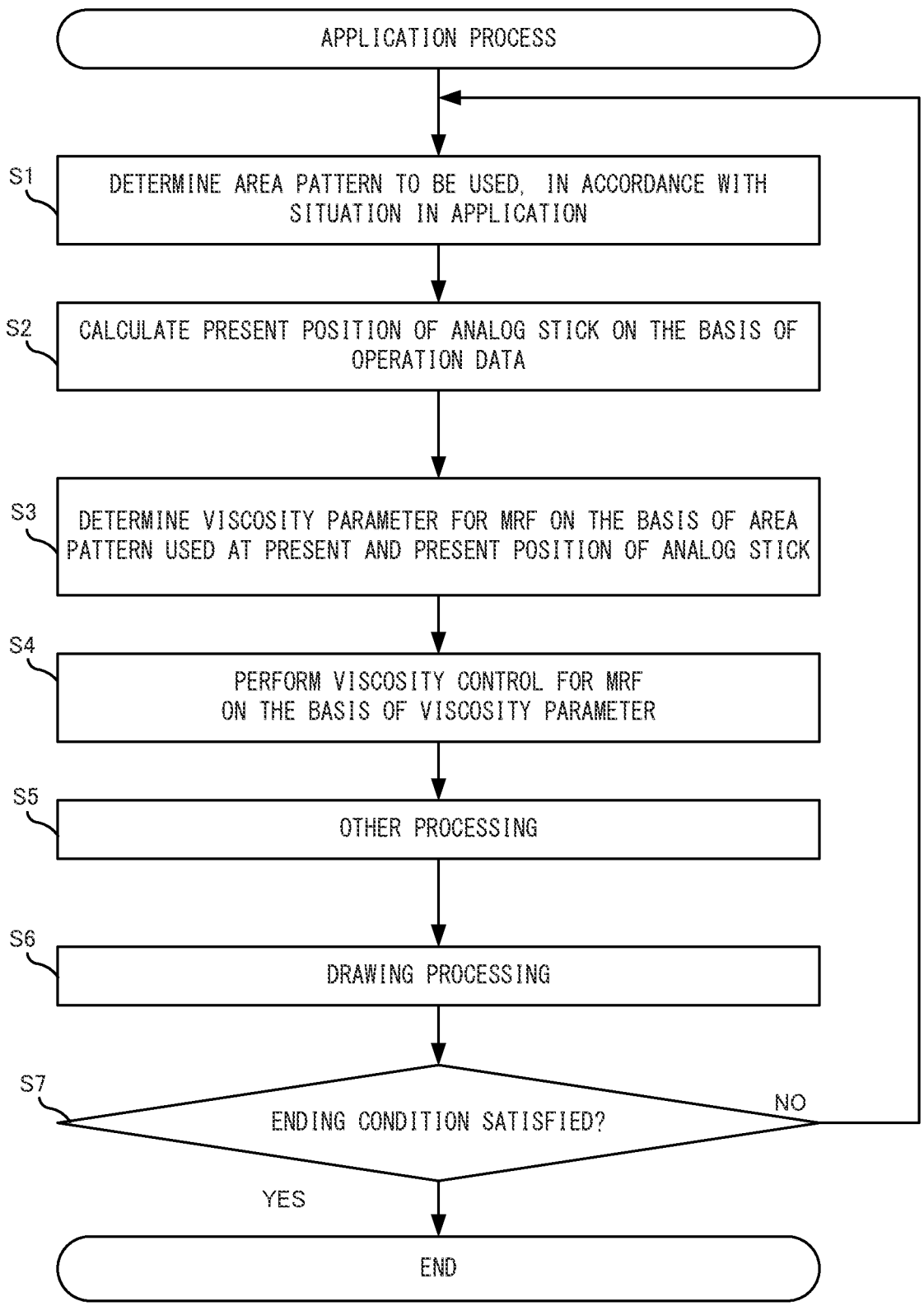
FIG. 13 is a non-limiting example of a flowchart showing the details of an application process.

Next, a specific example of viscosity control processing in the exemplary embodiment will be described. FIG. 13 is a flowchart showing an example of the viscosity control processing in the exemplary embodiment. First, in step S1, the processor 11 determines the area pattern to be used, in accordance with the situation and the scene in the application at this time. The determination method may be any method. For example, the determination may be performed on the basis of whether or not the vitality value of an operation target object is a predetermined value or less, whether or not the position of the operation target object in a virtual space is in a predetermined area, and the like. Then, information specifying the determined area pattern is set in the used area data 514.

Next, in step S2, the processor 11 calculates the present position of the analog stick 42 on the basis of the operation data 516.

Next, in step S3, the processor 11 determines the viscosity parameter on the basis of the area pattern set in the used area data 514 and the present position of the analog stick 42. That is, a viscosity parameter corresponding to the first viscosity or a viscosity parameter corresponding to the second viscosity is determined in accordance with the present position of the analog stick 42.

Regarding the processing in step S3, in another exemplary embodiment, presets of viscosity parameters may be provided in a memory of the controller control section 41, and the preset may be designated in the processing in step S3.

Next, in step S4, the processor 11 performs viscosity control for the MRF on the basis of the determined viscosity parameter. In this example, the processor 11 outputs the viscosity parameter from the application (via system software) to the controller control section 41. Accordingly, the controller control section 41 controls the intensity of a magnetic field to be applied to the MRF unit, on the basis of the viscosity parameter. Thus, the viscosity of the MRF is controlled.

In another exemplary embodiment, in a case where presets as described above are provided at the controller side, the viscosity of the MRF may be controlled through control (mainly) by the controller control section 41 on the basis of the preset designated in step S3, for example, irrespective of the output from the application.

Next, in step S5, the processor 11 executes other processing in the application. For example, processing of moving the operation object on the basis of the present position of the analog stick 42, and the like are performed.

Next, in step S6, the processor 11 generates an image in which the above processing result is reflected, and outputs the image to the monitor 3.

Next, in step S7, the processor 11 determines whether or not a condition for ending the application is satisfied. For example, whether or not an instruction operation to end the application has been performed, or the like is determined. As a result of the determination, the ending condition is satisfied (YES in step S7), the application process is ended. If the ending condition is not satisfied (NO in step S7), the process returns to step S1, so as to be repeated.

As described above, in the first example, viscosity control for the MRF is performed on the basis of the present position of the analog stick 42. Further, area patterns defining the shapes, sizes, and ranges of areas are prepared, and a plurality of area patterns are selectively used in accordance with the situation in the application. Thus, it is possible to let the user receive various operation feelings in accordance with the situation in the application.

Second Example

Next, a second example will be described. In the above first example, viscosity control is performed on the basis of the present position of the analog stick 42. On the other hand, in the second example, a case of further performing viscosity control based on the displacement direction of the analog stick 42 will be described.

Figure 14:
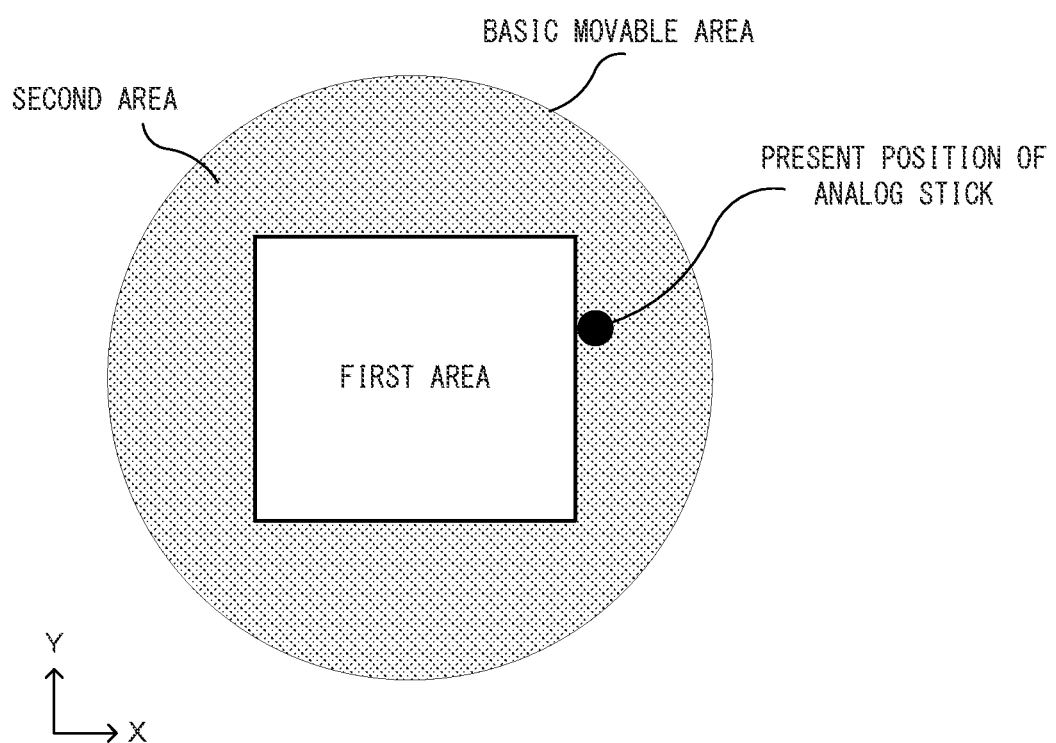
FIG. 14 shows a non-limiting example of an area pattern.

In the second example, for example, it is assumed that two areas which are the first area and the second area as shown in FIG. 10 are defined as an area pattern, and processing in the second example is performed in such a case where the present position of the analog stick 42 is located in the second area as shown in FIG. 14, for example. Here, it is assumed that the analog stick 42 is located outside the boundary of the first area and thus the viscosity of the MRF has changed from the first viscosity (low viscosity) to the second viscosity (high viscosity), so that the analog stick 42 no longer moves (with a normal force), for example. In this case, in the second example, the displacement direction of the analog stick 42 from this position is detected or calculated by a predetermined method (described later). Then, if the displacement direction is a direction of moving toward the first area, control is performed so as to reduce the viscosity. On the other hand, if the displacement direction is a direction of moving away from the first area, control is performed so as to increase the viscosity. That is, in the second example, in a case where the analog stick 42 is located outside the first area, whether the analog stick 42 is to move away from the first area or to approach the first area is determined, and the viscosity is controlled in accordance with the determination result.

FIG. 15 shows an example of a flow of the control process in the second example. This process can be performed in a case where the present position of the analog stick is outside the first area as shown in FIG. 14. First, in step S21, the processor 11 calculates or detects the displacement direction of the analog stick 42. Next, in step S22, the processor 11 determines whether the displacement direction is a direction of approaching the first area or a direction of moving away from the first area. The method for calculation/detection and determination for the displacement direction may be any method. As examples, two methods will be briefly described below.

(First Method: Method of Performing Determination by Relative Positions Before and After Movement)

As a first method, a method of performing determination on the basis of relative positions before and after movement of the analog stick 42 will be described. Here, as described above, the second viscosity is a "high viscosity at such a level that the analog stick 42 cannot be moved with a normal force degree", but is also such a viscosity that the analog stick 42 can be moved if a greater force than a normal force degree is applied with the fingers. Therefore, the description is based on the assumption that the analog stick 42 can be moved also outside the first area with a greater force than a normal force degree (though movement is slow). Then, in this method, the processor 11 calculates, for example, a movement vector, on the basis of the coordinates before movement and the coordinates after movement of the analog stick 42. Then, the processor 11 determines whether the direction of the movement vector is a direction of approaching the first area or a direction of moving away from the first area. With this method, the displacement direction of the analog stick 42 can be calculated and determined.

(Second Method: Method Using Sensor)

Next, as another example, a second method will be described. In the second method, a high-accuracy sensor capable of detecting the displacement direction is mounted to the analog stick 42, and the detection result is used. As an example of the sensor, a force sensor is mounted to the analog stick 42. In this case, it is possible to instantaneously recognize the displacement direction in which the analog stick is to be displaced at present, in accordance with the finger force applied to the analog stick 42. Thus, the processor 11 can determine the displacement direction on the basis of the detection result of the force sensor, and can determine whether or not the displacement direction is a direction of approaching the first area.

As a result of the above determination, if the displacement direction is a direction of approaching the first area (YES in step S22), in step S23, the processor 11 performs control so as to make the viscosity of the MRF smaller than the present viscosity. For example, the viscosity may be made smaller by multiplying the present viscosity by a predetermined coefficient defined in advance or a coefficient according to the magnitude of the above movement vector or the magnitude of the force detected by the force sensor. This can make it easier to move the analog stick 42 into the first area.

On the other hand, as a result of the determination in step S22, if the displacement direction is not a direction of approaching the first area (NO in step S22), in step S24, the processor 11 performs control so as to make the viscosity of the MRF greater than the present viscosity. This can make it more difficult to move the analog stick 42.

Regarding the processing in step S24, in another example, control may be performed so as to keep the present viscosity, instead of making the viscosity greater. Also in this case, it is possible to keep the difficulty in moving the analog stick 42.

Thus, the detailed description of the process in the second example has finished.

As described above, in the second example, viscosity control based on the displacement direction of the analog stick 42 is performed. Thus, for example, when the analog stick 42 is located outside the first area in the area pattern as shown in FIG. 14, in particular, when the analog stick 42 is located near the boundary between the two areas, favorable viscosity control can be performed for an operation feeling on the analog stick 42.

[Modifications]

In a case where the area pattern to be used is changed (switched) in accordance with the situation or the like in the application, before actual change, for example, a notification that "the movable range of the analog stick 42 will be changed now, so please return the position of the analog stick 42 to the initial position" may be issued, and control of changing the area pattern to be used may be performed after the position of the analog stick 42 returns to the initial position. The position of the return destination is not limited to the initial position and may be a predetermined position. In addition, the timing of performing such control is not limited to a time before the area pattern is changed. After the area pattern is changed, while a notification for returning to the initial position is issued, processing may be performed such that viscosity control is not started until the position of the analog stick 42 actually returns. In addition, when the area pattern to be used is changed, a notification indicating that fact may be displayed. This notification may be displayed for a predetermined time period after the area pattern to be used is changed, and then may be deleted, or the notification may continue being displayed while the area pattern to be used is changed. In addition, an image indicating the size and/or the shape (relative to the basic movable area) of the area pattern being used may be displayed together with or instead of the above notification.

In another exemplary embodiment, the user may be allowed to arbitrarily change the area pattern, instead of changing in accordance with the situation in the application. For example, a predetermined button may be defined as a button for switching, and a first area pattern and a second area pattern are switched therebetween every time the button is pressed. Alternatively, control may be performed such that a predetermined area pattern is made effective only while the button is being pressed. Regarding assignment of the button, a button having such a function may be assigned through button setting in a predetermined application. Alternatively, such a button may be assigned as a function of the system.

The definition content of the area pattern may be allowed to be arbitrarily set by the user. This is for making it possible to reflect the preference or individual difference of the force degree exerted with the fingers by each user. For example, there may be a user who desires, as a favorite operation feeling, that the distance from the center to the outer edge part in the basic movable area, i.e., the distance in a case of performing an input by maximally tilting the analog stick, is shorter than the standard distance. In this case, for example, the following operation and setting processing may be performed. First, a predetermined setting screen is displayed, and a circular image corresponding to the basic movable area is displayed. In addition, a slider for changing the size of the circle is also displayed (the size of the basic movable area is defined as 100%). Then, the user is let to designate the size of the circle by the slider and perform an operation of tilting the analog stick from the center position to the outer edge position of the circle image. This operation is repeated, and when the user has found a preferable circle size, the outside of the circle set by the slider at this time is set as the second area having the second viscosity, and the inside of the circle is set as the first area having the first viscosity, thus defining an area pattern, which is then stored as an area pattern set by the user. Here, it is assumed that the size of the circle in the first area set as described above is 80% of the basic movable area. In this case, tilting of the analog stick 42 is stopped at a position corresponding to 80% in the basic movable area, and thus an input of tilting by 100% cannot be performed with respect to the basic movable area. Therefore, during usage of the area pattern set by the user in this case, the input value may be corrected so that tilting by 80% with respect to the basic movable area is regarded as an input of tilting by 100% (regarded as a state in which the analog stick 42 is fully tilted).

In the above exemplary embodiment, the case where the controller has only one analog stick 42 has been shown. In another exemplary embodiment, a controller having two analog sticks 42, e.g., a "right stick" and a "left stick", may be used. In this case, while the sizes of the basic movable areas for both sticks are the same, area patterns to be used for the "right stick" and the "left stick" may be different. For example, the area pattern to be used for the "right stick" may be defined such that movement can be performed only in the left-right direction, and the area pattern to be used for the "left stick" may be defined such that movement can be performed only in the up-down direction.

In the above analog stick 42, the positions of the MRF units shown above are merely an example and the MRF units may be at positions other than the above ones. For example, a configuration in which the stick portion 401 directly contacts with the MRF may be adopted, or the MRF units may be provided at any positions as long as it is possible to cause an influence on ease of movement of the stick portion 401.

In the above second example, it has been described that control is performed so as to increase or reduce the present viscosity in accordance with whether or not the displacement direction is a direction of approaching the first area. In another exemplary embodiment, various other controls may be performed without limitation to the above control. For example, when the displacement direction is a direction of moving away from the first area, an alarm indication may be displayed. In addition, for example, if an operation in which the displacement direction is a direction of moving away from the first area has continued for a predetermined period or longer, control may be performed so that the entire basic movable area has the first viscosity. That is, execution of the viscosity control for limiting the movable area as described above may be stopped (limitation of the movable area is canceled).

In the above first example, data in which parameters for realizing the first viscosity and the second viscosity are defined in advance is used as the viscosity definition data 515. Without limitation thereto, these parameters may be calculated at each time in accordance with the situation in the application.

In the above description, the information processing system in which the information processing apparatus main body 2, the monitor 3, and the controller 4 are configured separately from each other has been shown. Alternatively, the above configuration and control are also applicable to apparatuses such as a hand-held information processing apparatus in which an information processing apparatus main body, a predetermined display section, and an analog stick and/or a button are integrated.

What is claimed is:

1. An information processing system comprising:
   a controller including:
   an operation element configured to be displaced from an initial position to a displaced position by a user's operation;
   a restriction member configured to restrict movement of the operation element to a movable area, the movable area being a two-dimensional area, and the movable area comprising a first area and a second area that is different from the first area;
   a resistance section configured to resist movement of the operation element, the resistance section comprising a first magnetorheological fluid container that contains a magnetorheological fluid having viscosity that is changed by changing an intensity of a magnetic field applied to the magnetorheological fluid; and
   a magnetic field generation section comprising a coil configured to apply the magnetic field to the magnetorheological fluid; and
   a circuit configured to control the magnetic field generation section, and the circuit being configured to operate in a first state or a second state, wherein:

in the first state, the circuit being configured to control the magnetic field generation section such that the user can move the operation element in the movable area without resistance from the resistance section, in the second state, the circuit being configured to:
control the magnetic field generation section to change the intensity of the magnetic field such that when the operation element is located in the first area of the movable area, the magnetic field generation section applies the magnetic field to the magnetorheological fluid at a first intensity that corresponds to a first viscosity of the magnetorheological fluid, and the initial position being located in the first area, and control the magnetic field generation section to change the intensity of the magnetic field such that when the operation element is located in the second area, the magnetic field generation section applies the magnetic field to the magnetorheological fluid at a second intensity that is different from the first intensity and corresponds to a second viscosity of the magnetorheological fluid that is different from the first viscosity, wherein the information processing system is configured to output a prompt to the user to move the operation element to the first area before the circuit switches from the first state to the second state, and wherein the information processing system is configured to output an indication to the user that the circuit switched to the second state.

2. The information processing system according to claim 1, wherein
the second viscosity is higher than the first viscosity.

3. The information processing system according to claim 1, wherein
the first viscosity allows the operation element to be displaced, and the second viscosity causes the resistance section to resist displacement of the operation element more than the first viscosity.

4. The information processing system according to claim 1, further comprising an information processing apparatus configured to execute a predetermined application, wherein
the predetermined application includes an instruction to define a position and/or a shape of the first area.

5. The information processing system according to claim 4, wherein
the predetermined application includes an instruction to define a predetermined object that is configured to be operated as an operation target object by the user, and
the position and/or the shape of the first area is based on a state of the operation target object when the predetermined application is executed by information processing apparatus.

6. The information processing system according to claim 4, wherein
the predetermined application includes an instruction to define a predetermined object that is configured to be operated as an operation target object in a virtual space by the user, and
the position and/or the shape of the first area is based on a position of the operation target object in the virtual space and/or a surrounding environment around the position of the operation target object.

7. The information processing system according to claim 4, wherein
the predetermined application includes an instruction to define a plurality of objects, any of the objects being configured to be selected as an operation target object by the user or any of the objects being configured to be automatically selected, and
the position and/or the shape of the first area is based on the selected operation target object.

8. The information processing system according to claim 4, wherein
the instruction to define the position and/or the shape of the first area are based on the user's operation of the operation element.

9. The information processing system according to claim 1, wherein
the circuit is configured to instruct a display to notify the user of information indicating a shape of the first area.

10. The information processing system according to claim 1, further comprising a displacement direction determination sensor configured to determine a displacement direction of the operation element, wherein
when the operation element is located in the second area, the viscosity is controlled in accordance with the displacement direction of the operation element.

11. The information processing system according to claim 10, wherein
when the displacement direction determination sensor determines that the operation element is moving from the second area toward the first area, the circuit is configured to control the magnetic field generation section to apply the magnetic field to the magnetorheological fluid at an intensity that reduces the viscosity of the magnetorheological fluid.

12. The information processing system according to claim 11, wherein
when the displacement direction determination sensor determines that the operation element is moving toward the initial position, the circuit is configured to control the magnetic field generation section to apply the magnetic field to the magnetorheological fluid at an intensity that reduces the viscosity of the magnetorheological fluid.

13. The information processing system according to claim 10, wherein
when the displacement direction determination sensor determines that the operation element is moving from the second area toward the first area, the circuit is configured to control the magnetic field generation section to apply the magnetic field to the magnetorheological fluid at an intensity that increases the viscosity of the magnetorheological fluid or maintains the same viscosity of the magnetorheological fluid.

14. The information processing system according to claim 1, wherein
the first area is one of a first-type area having a shape with at least three corners as vertices, a second-type area having a shape extending in one predetermined axis direction that passes through the initial position, and a third-type area including an area extending in the one predetermined axis direction and an area extending in a second direction crossing perpendicularly to the one predetermined axis direction at the initial position.

15. The information processing system according to claim 1, wherein
the first area has an area equal to the movable area, an entire periphery of the second area is surrounded by the first area, and the second area occupies part of the first area.

16. The information processing system according to claim 1, wherein the operation element is a first operation element,
the controller includes a second operation element, and
the first area set for the first operation element and the first area set for the second operation element are different in area size and/or area shape.

17. The information processing system according to claim 1, wherein
after the information processing system notifies the user with an instruction to move the operation element to the first area the circuit, the circuit is configured to switch from the first state to the second state in response to the operation element entering the first area.

18. A controller comprising:
an operation element configured to be displaced from an initial position to a displaced position by a user's operation;
a restriction member configured to restrict movement of the operation element to a movable area, the movable area being a two-dimensional area, and the movable area comprising a first area and a second area that is different from the first area;
a resistance section configured to resist movement of the operation element, the resistance section comprising a first magnetorheological fluid container that contains a magnetorheological fluid having viscosity that is changed by changing an intensity of a magnetic field applied to the magnetorheological fluid;
a magnetic field generation section comprising a coil configured to apply the magnetic field to the magnetorheological fluid; and
a circuit configured to control the magnetic field generation section, and the circuit being configured to operate in a first state or a second state, wherein:
in the first state, the controller being configured to cause the circuit to control the magnetic field generation section such that the user can move the operation element in the movable area without resistance from the resistance section,
in the second state, the controller being configured to cause the circuit to:
control the magnetic field generation section to change the intensity of the magnetic field such that when the operation element is located in the first area of the movable area, the magnetic field generation section applies the magnetic field to the magnetorheological fluid at a first intensity that corresponds to a first viscosity of the magnetorheological fluid, and the initial position being located in the first area, and
control the magnetic field generation section to change the intensity of the magnetic field such that when the operation element is located in the second area, the magnetic field generation section applies the magnetic field to the magnetorheological fluid at a second intensity that is different from the first intensity and corresponds to a second viscosity of the magnetorheological fluid that is different from the first viscosity,
wherein the circuit is configured to generate a first signal to prompt the user to move the operation element to the first area before the circuit switches from the first state to the second state, and
wherein the circuit is configured to generate a second signal to notify the user that the circuit switched to the second state.

19. An information processing method for controlling an information processing system that includes a controller having an operation element configured to be moved by a user between an initial position and a displaced position, the information processing method comprising:
in a first state of the information processing system, controlling a magnetic field generation section such that the user can move the operation element in a movable area of the controller without resistance from the magnetic field generation section, and the movable area comprising a first area and a second area that is different from the first area;
in a second state of the information processing system:
controlling the magnetic field generation section to change an intensity of a magnetic field such that when the operation element is located in the first area of the movable area, the magnetic field generation section applies the magnetic field to a magnetorheological fluid at a first intensity that corresponds to a first viscosity of the magnetorheological fluid, and the initial position being located in the first area; and
controlling the magnetic field generation section to change the intensity of the magnetic field such that when the operation element is located in the second area, the magnetic field generation section applies the magnetic field to the magnetorheological fluid at a second intensity that is different from the first intensity and corresponds to a second viscosity of the magnetorheological fluid that is different from the first viscosity,
outputting a prompt to the user to move the operation element to the first area before the information processing system switches from the first state to the second state, and
outputting an indication to the user that the information processing system switched to the second state.

20. A computer-readable non-transitory storage medium having stored therein information processing program instructions that, when executed, cause a processor of an information processing system that includes a controller having an operation element configured to be moved by a user between an initial position and a displaced position, to perform operations comprising:
in a first state of the information processing system, causing a circuit to control a magnetic field generation section such that the user can move the operation element in a movable area of the controller without resistance from the magnetic field generation section, and the movable area comprising a first area and a second area that is different from the first area;
in a second state of the information processing system:
causing the circuit to control the magnetic field generation section to change an intensity of a magnetic field such that when the operation element is located in the first area of the movable area, the magnetic field generation section applies the magnetic field to a magnetorheological fluid at a first intensity that corresponds to a first viscosity of the magnetorheological fluid, and the initial position being located in the first area; and
causing the circuit to control the magnetic field generation section to change the intensity of the magnetic field such that when the operation element is located in the second area, the magnetic field generation section applies the magnetic field to the magnetorheological fluid at a second intensity that is different from the first intensity and corresponds to a second viscosity of the magnetorheological fluid that is different from the first viscosity;

causing the circuit to generate a first signal to prompt the user to move the operation element to the first area before the circuit switches from the first state to the second state; and causing the circuit to generate a second signal to notify the user that the information processing system switched to the second state.

\* \* \* \* \*